US005969836A

United States Patent [19]

Foltzer

[11] Patent Number: 5,969,836

[45] Date of Patent: Oct. 19, 1999

[54] METHOD AND APPARATUS FOR SIMULTANEOUS TRANSMISSION OF DIGITAL TELEPHONY AND ANALOG VIDEO OVER A SINGLE OPTIC FIBER USING WAVE DIVISION MULTIPLEXING

[75] Inventor: Lawrence Edwin Foltzer, Sonoma County, Calif.

[73] Assignee: Alcatel USA Sourcing, L.P., Plano, Tex.

[21] Appl. No.: 08/991,106

[22] Filed: Dec. 12, 1997

[51] Int. Cl.[6] .............................. H04B 10/24; H04J 14/02

[52] U.S. Cl. ............................ 359/114; 359/125; 348/12; 455/6.1

[58] Field of Search ............................ 359/114, 124–125, 359/127, 130–131, 173; 348/12, 6; 455/6.1, 3–1

[56] References Cited

U.S. PATENT DOCUMENTS 5,351,148 9/1994 Maeda et al. .......................... 359/124
5,680,238 10/1997 Masuda .................................. 359/125

*Primary Examiner*—Kinfe-Michael Negash

*Attorney, Agent, or Firm*—Fliesler Dubb Meyer & Lovejoy, LLP

[57] ABSTRACT

Downstream digital telephony signals are transmitted over the 1310 nm transmission band of a silica optic fiber. Upstream digital telephony signals are transmitted over a "short wavelength" portion of the 1550 nm transmission band of the optic fiber, i.e. within a portion of the 1550 nm transmission band having wavelengths less than a predetermined threshold wavelength of 1550 nm. Simultaneously, downstream analog video signals are transmitted over a "long wavelength" portion of the 1550 nm transmission band of the optic fiber, i.e. within a portion of the 1550 nm transmission band having wavelengths exceeding the predetermined threshold wavelength of 1550 nm but still within an erbium-doped fiber amplifier gain profile. Thus, the upstream digital telephony signals are always transmitted at wavelengths shorter than the threshold wavelength and the downstream analog video signals are always transmitted at wavelengths longer than the threshold wavelength. Accordingly, no significant signaling conflicts occur between the upstream digital telephony signals and the downstream analog video signals, and both upstream and downstream digital telephony signals and analog video signals are reliably carried over the single optic fiber.

40 Claims, 6 Drawing Sheets

METHOD AND APPARATUS FOR SIMULTANEOUS TRANSMISSION OF DIGITAL TELEPHONY AND ANALOG VIDEO OVER A SINGLE OPTIC FIBER USING WAVE DIVISION MULTIPLEXING

BACKGROUND OF THE INVENTION

1. Field of the Invention

The invention generally relates to fiber optic signal transmission systems and in particular to systems for transmitting both digital telephony and analog video signals.

2. Description of the Related Art

In many locations, optic fibers have been deployed for transmitting digital telephony signals, such as signals carrying telephone conversations, facsimile transmissions or Internet data communications. As shown in FIG. 1, an optic fiber 10 may interconnect a host digital terminal (HDT) 12 of a telephone company central office (CO) 14 with a curbside optical network unit (ONU) 16. The HDT provides an interface between the optic fiber and other components of the CO such as telephone switching equipment 18. The ONU provides an interface between the optic fiber and analog tip and ring telephone lines 22 connected into homes or offices 24. Usually only a single optic fiber is deployed between the CO and the ONU which carries both upstream digital telephony signals (i.e. signals sent from the ONU to the CO) and downstream digital telephony signals (i.e. signals sent from the CO to the ONU). Typically, the upstream and downstream signals are transmitted within separate transmission bands of the single optic fiber to avoid signal conflicts, crosstalk and the like. This is referred to as broad band wave division multiplexing. Optic fibers composed of silica have three useful transmission bands located at about 850, 1310 and 1550 nanometers (nm), which are hereinafter referred to respectively as the "850 band", the "1310-band" and the "1550-band". The existence of these bands is partly a function of the characteristics of the fiber itself, including such factors as the amount of optical absorption and dispersion within the fiber at different wavelengths, and partly a function of practical limitations on the availability of suitable devices, such as lasers and LED's, used for coupling light into the fiber at different wavelengths. As a result of these and other factors, it is currently most practical, at least for the purposes of digital telephony, to transmit either within the 1310-band or the 1550-band. The 850 band is not typically used for digital telephony.

In the example of FIG. 1, the downstream signals are transmitted into the 1310-band using an appropriate LED or laser configured for generating signals near 1310 nm. The upstream signals are transmitted into the 1550-band using an appropriate LED or laser for generating signals near 1550 nm. The transmission parameters and the operational characteristics of the fiber optic equipment are often configured to meet TA/R-909 loss budgets to assure reliable reception of signals despite losses associated with fiber splices and fiber connectors (not separately shown) and transmission losses in the fiber itself.

It is becoming increasingly desirable, however, to also provide for the transmission of other types of signals between the Co and the ONU along with the digital telephony signals. Specifically, it would be highly desirable to be able to transmit analog video signals, such as those provided by cable television (CAT) companies, from the CO to the ONU for subsequent routing into homes or offices. Indeed, by providing for the transmission of both digital telephony signals and analog video signals, the telephone company operating the optic fibers can thereby provide both telephone service and television service to its customers.

Problems, however, arise in connection with transmitting both upstream and downstream digital telephony signals as well as analog video signals over a single optic fiber. In particular, problems arise because the two aforementioned transmission bands, namely the 1550-band and the 1310-band, are the only two transmission bands that are commercially practical for transmitting digital telephony and analog video within silica fibers. Hence, only two transmission bands are available to handle the three required transmission channels, i.e. the upstream telephony, the downstream telephony and the downstream analog video.

One option is to transmit both the upstream and downstream telephony within common wavelengths of the 1310-band and to transmit the analog video within the 1550-band. This option is shown in FIG. 2, wherein downstream analog video, received from an analog video source 26, is transmitted by HDT 12 (or by a another device, such as a high density fiber bank (HDFN), not separately shown) over optic fiber 10 within the 1550-band to ONU 16 then converted to RF and transmitted through a co-axial cable 28 into houses or offices 24. Downstream telephony is transmitted over optic fiber 10 within the 1310-band to ONU 16 then converted to tip and ring signals and coupled into the houses or offices via tip and ring telephone lines 22. Upstream telephony is transmitted over optic fiber 10 within the 1310-band from ONU 16 to HDT 12 then converted to signals appropriate for coupling to switching equipment 18.

Thus, although not separately shown, the upstream end of the optic fiber is provided with an analog video 1550-band transmitter, a digital telephony 1310-band transmitter and a digital telephony 1310-band receiver. The downstream end of the fiber is provided with an analog video 1550-band receiver, a digital telephony 1310-band transmitter and a digital telephony 1310-band receiver. Appropriate couplers are employed for routing the telephony signals between the respective upstream and downstream 1310-band telephony transmitters and receivers and for routing the downstream analog video signals from the 1550-band analog video transmitter to the analog video receiver. In particular, a single-frequency coupler is employed at each end of the optic fiber for separating upstream and downstream telephony signals. The single-frequency coupler routes outgoing telephony signals onto the optic fiber from the respective transmitter and routes incoming telephony signals from the fiber into the respective receiver. A 1310/1550 window-splitting coupler (or, alternatively, a fused biconical tapered coupler (FBTC)) is also employed at each end of the optic fiber. The 1310/1550 window-splitting coupler at the upstream end of the optic fiber combines downstream telephony signals with downstream video signals for transmission over the optic fiber and splits off upstream telephony signals for routing to the upstream telephony receiver through the respective single-frequency coupler. The 1310/1550 window-splitting coupler at the downstream end of the optic fiber splits downstream telephony signals from downstream video signals for routing to the respective telephony or video receiver and couples upstream telephony signals onto the optic fiber.

However, the transmission of both upstream and downstream signals over the 1310-band through a single fiber leads to various problems. For example, "silent failure" can occur whereby a fracture in the optic fiber causes a transmitted signal to be reflected back along the optic fiber. In the example of FIG. 2, a digital telephony signal transmitted downstream in the 1310-band through the optic fiber may be reflected back upstream through the optic fiber as a result of a fracture (not shown). The 1310-band receiver at the upstream end of the fiber may erroneously receive the reflected signal and assume that the reflected signal was actually a signal transmitted from the downstream end of the fiber and that the connection to the downstream end of the optic fiber is still intact.

Silent failure can be detected by carefully managing optical power transmission levels and by determining whether all received signals lie within a narrow acceptable power level range consistent with a signal transmitted from the opposite end of the optic fiber. If a received signal has a power level that is too low or too high, it is presumed to be a reflected signal and appropriate error signals are generated. Alternatively, burst transmission schemes may be employed whereby the transmitter at one end of the optic fiber selectively transmits bursts of compressed data signals. The transmitter at the other end of the optic fiber transmits reply bursts after carefully timed intervals. If reply signals are received at some time other than within narrowly acceptable time intervals, the reply signals are presumed to be a reflected signals from a break in the optic fiber and appropriate action is taken. Although both techniques are capable of detecting silent failure, significant costs arise as a result of the need to either provide for careful power level management or to provide for burst processing.

Other problems also occur as a result of carrying both upstream and downstream digital telephony signals over the 1310-band. Crosstalk can occur between the transmitter and the receiver pair at each end of the fiber because both the transmitter and the receiver are operating in the same frequency band. Also, as noted, a single-frequency coupler is required at each end of the optic fiber to be able to carry both upstream and downstream telephony signals within the 1310-band. Single-frequency couplers typically cause a 3 db loss in signal power thereby reducing the overall efficiency of the system and hence adding associated costs.

Thus significant problems arise in attempting to carry both upstream and downstream digital telephony signals within common wavelengths of the 1310-band. Another single-fiber option would be to attempt to carry downstream digital telephony over the 1310-band and to carry both the upstream digital telephony and the downstream analog video over common wavelengths of the 1550-band. But many of the same problems as described above occur. Indeed, insofar as cross talk is concerned, matters are even worse because transmission power levels for analog video are typically far greater than for digital telephony so problems with cross talk are much more significant when downstream analog video is carried over the same transmission channel as upstream digital telephony, i.e. the upstream digital telephony receiver may erroneously receive a portion of the downstream analog video signal.

Moreover, significant difficulties arise when attempting to route downstream telephony over the 1310-band and to route both downstream video and upstream telephony over common wavelengths of the 1550-band when using conventional broad band couplers. Conventional couplers, such as 1310/1550 window-splitting beam-splitter couplers or FBTC's, are simply not effective for routing upstream 1550-band telephony signals over a single fiber to an upstream receiver while also routing downstream 1310-band telephony signals and 1550-band video signals over the same fiber to respective downstream receivers, at least not when common wavelengths of the 1550-band are employed for both the upstream telephony signals and the downstream video signals. In particular, such conventional couplers cannot be configured to adequately route upstream 1550-band signals onto the fiber while also splitting downstream 1310-band telephony signals from downstream 1550-band video signals received over the same fiber for coupling to separate receivers. Accordingly, with conventional systems, if video is to be transmitted along with telephony over a single fiber, the arrangement of FIG. 2 is employed wherein upstream and downstream telephony are both carried over the 1310-band and video is carried over the separate 1550-band. Although such an arrangement suffers from the problems summarized above, at least the necessary routing of the various signals from respective transmitters to respective receivers can be achieved using conventional couplers.

Yet another option, as shown in FIG. 3, is simply to provide a second optic fiber connecting the CO and the ONU with digital telephony carried over one fiber (10) and analog video carried over another (10'), but the cost of deploying a second optic fiber, particularly in areas already having a single optic fiber deployed, is usually prohibitive.

Accordingly, there is a significant need to provide for the ability to carry both downstream analog video and upstream and downstream digital telephony over a single optic fiber and it is to that end that the present invention are primarily directed.

SUMMARY OF THE INVENTION

In accordance with one aspect of the invention, a system is provided for communicating both analog video and digital telephony over a single optic fiber using wave division multiplexing. The system includes an analog video signal transmission means for transmitting analog video signals downstream through an optic fiber with the signals being restricted to a first portion of a first transmission band wherein the first portion has wavelengths exceeding a preselected threshold wavelength within the first band. The system also includes upstream digital telephony signal transmission means for transmitting digital telephony signals upstream through the optic fiber with signals being restricted to a second portion of the first band wherein the second portion has wavelengths less than the preselected threshold wavelength. The system further includes downstream digital telephony signal transmission means for transmitting digital telephony signals downstream through the optic fiber with signals being restricted to a second band that is entirely separate from the first band. Additionally the system includes routing means for routing the transmitted analog video signals, upstream digital telephony signals and downstream digital telephony signals through the optic fiber to respective receivers.

In one exemplary implementation, the first transmission band has wavelengths centered at about 1550 nm, the preselected threshold wavelength within the first band is set to about 1550 nm, and the second band has wavelengths centered at about 1310 nm. The analog video signal transmission means includes a peltier-cooled distributed feedback laser (DFB) transmitter with an erbium-doped fiber amplifier (EDFA), wherein the laser transmitter of the analog video signal transmission means has a thermally stabilized center wavelength greater than the threshold wavelength. The upstream digital telephony signal transmission means includes a Fabry-Perot laser transmitter, but wherein the laser transmitter of the upstream digital telephony signal transmission means has a center wavelength set to 1500 nm at 25 degrees Celsius and has a temperature drift profile configured to not exceed the threshold wavelength over an operating temperature range of the system. The downstream digital telephony signal transmission means includes a Fabry-Perot laser transmitter having a center wavelength set to 1310 nm at 25 degrees Celsius.

Thus, in the exemplary implementation, the system operates to transmit downstream digital telephony over the 1310-band of the optic fiber and to transmit upstream digital telephony signals over a portion of the 1550-band having wavelengths less than the threshold wavelength of 1550 nm. The system simultaneously operates to transmit downstream analog video over a portion of the 1550-band having wavelengths exceeding the threshold wavelength of 1550 nm. Thus, the upstream digital telephony signals are always transmitted at wavelengths shorter than the threshold wavelength of 1550 nm and the downstream analog video signals are always transmitted at wavelengths longer than the threshold wavelength. Accordingly, no significant signaling conflicts occur between the upstream digital telephony signals and the downstream analog video signals and both upstream and downstream digital telephony signals and analog video signals are reliably carried over the single optic fiber. Moreover, because the downstream video and the upstream telephony are transmitted over separate portions of the 1550-band, conventional couplers may be employed for routing the various signals from respective transmitters to respective receivers without encountering the same problems that arise when attempting to route downstream video and upstream telephony over common wavelengths of the 1550-band.

Other objects and advantages of the invention are achieved as well. Method embodiments of the invention are also provided.

DETAILED DESCRIPTION OF THE INVENTION

The invention relates to improved techniques for transmitting different types of signals over a single optic fiber. The invention will be described primarily with reference to an exemplary embodiment wherein digital telephony and analog video signals are transmitted, but principles of the invention may be applicable to other types of signal transmission systems for transmitting other types of signals.

Figure 1:
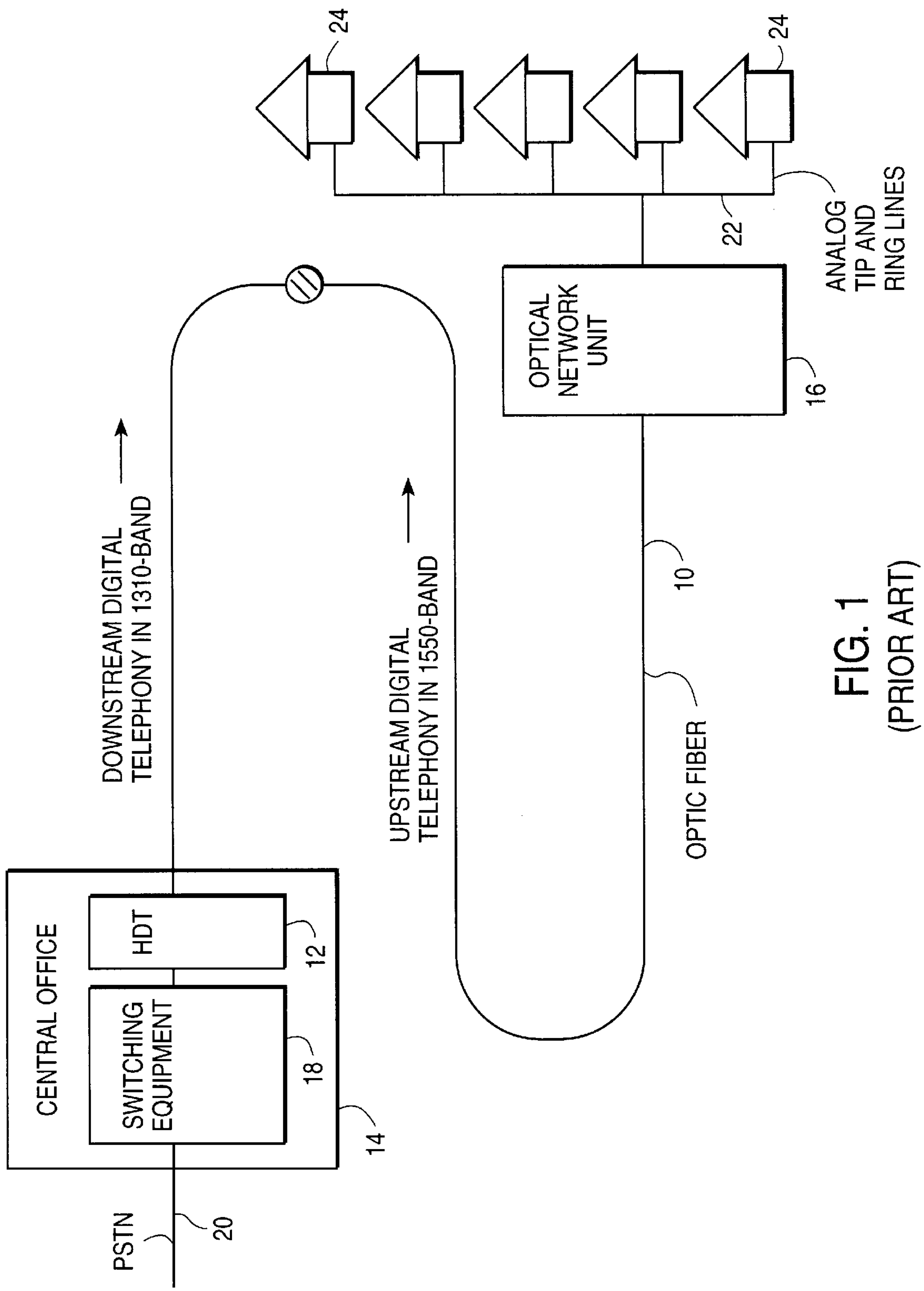
FIG. 1 is a block diagram illustrating a fiber optic system employing a single optic fiber to transmit upstream and downstream digital telephony.
Figure 2:
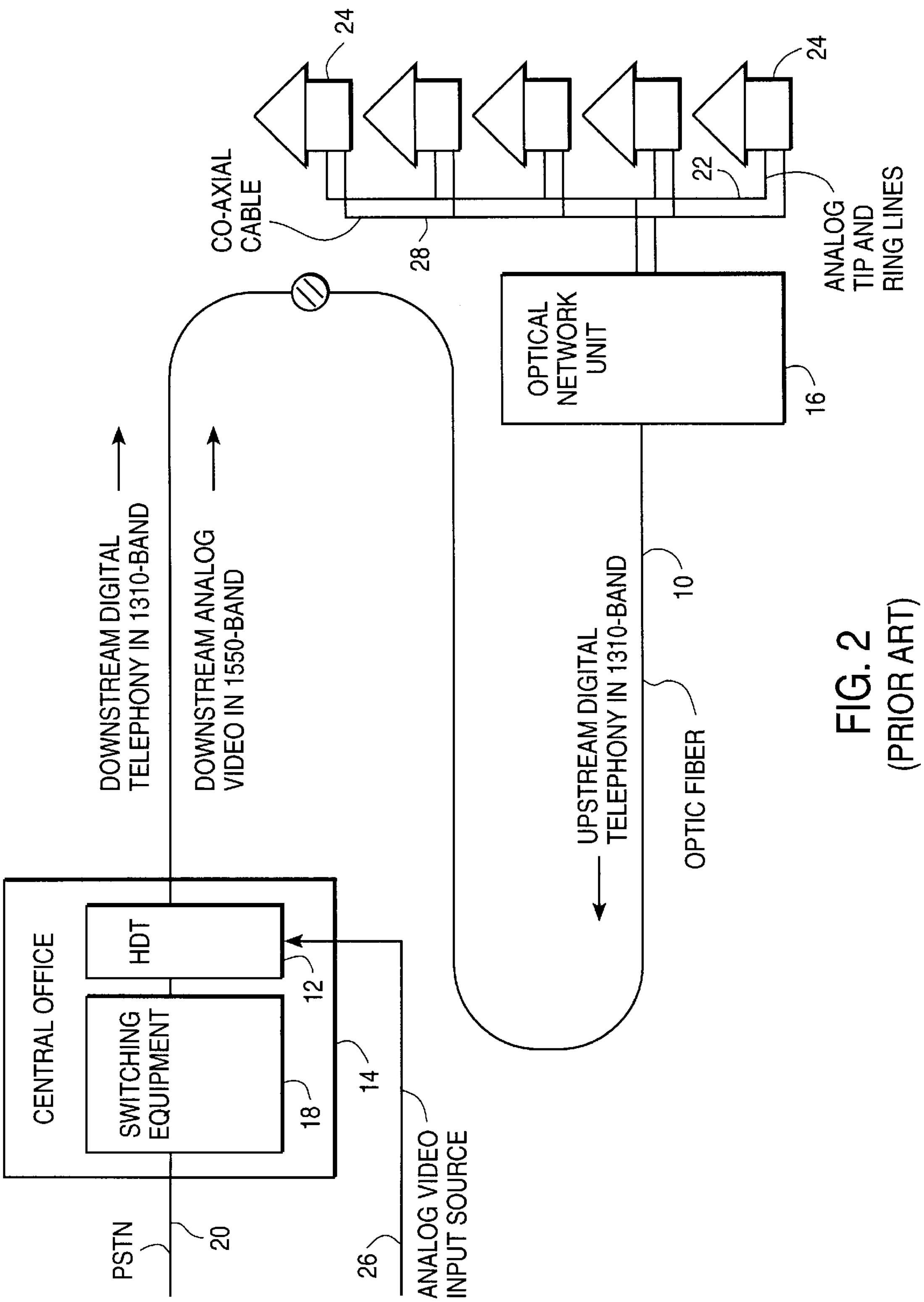
FIG. 2 is a block diagram illustrating one possible alternative fiber optic system which employs a single optic fiber to transmit upstream and downstream digital telephony and downstream analog video.
Figure 3:
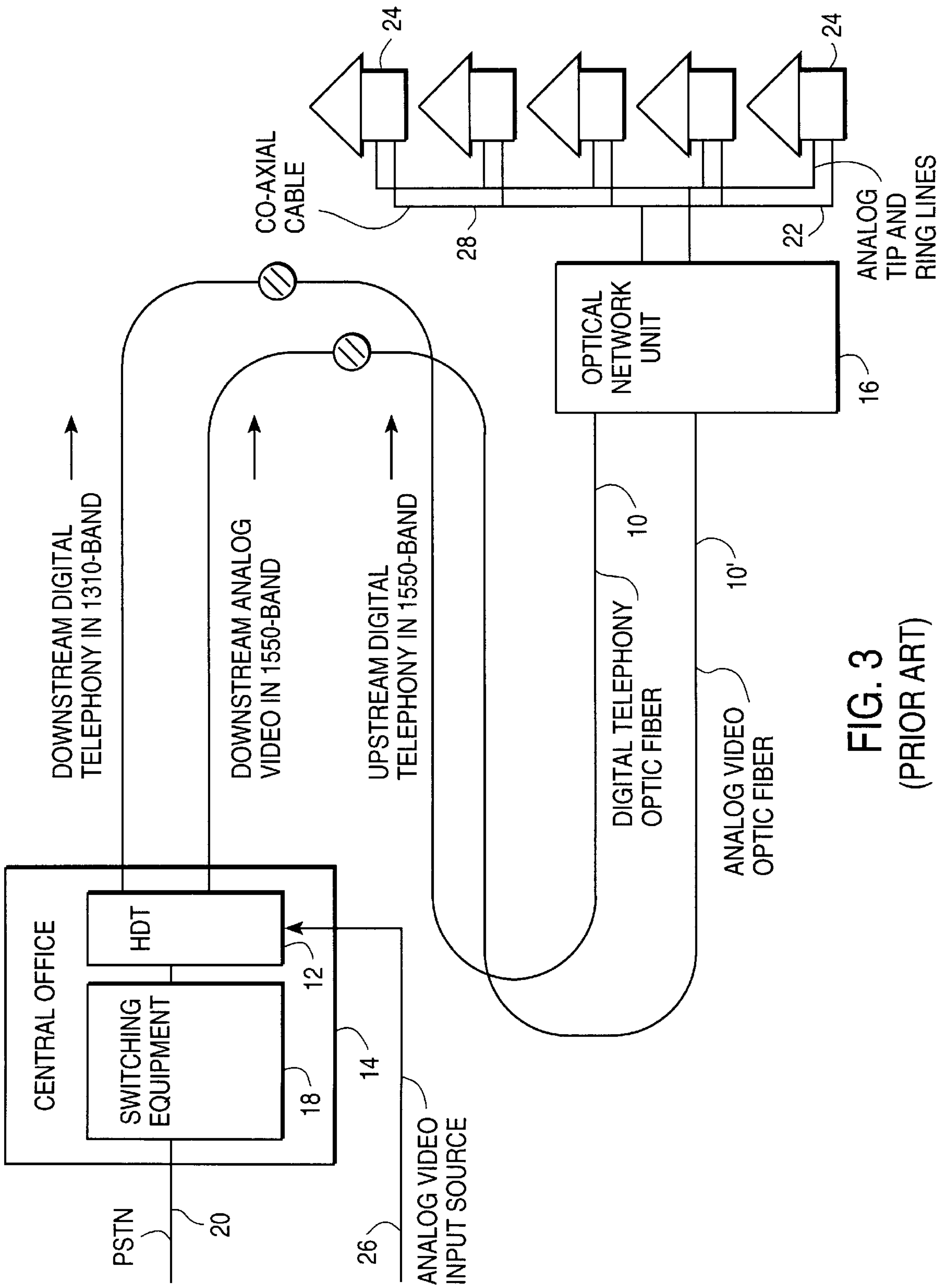
FIG. 3 is a block diagram illustrating another possible alternative fiber optic system which employs a pair of optic fibers, one to transmit upstream and downstream digital telephony and the other to transmit downstream analog video.
Figure 4:
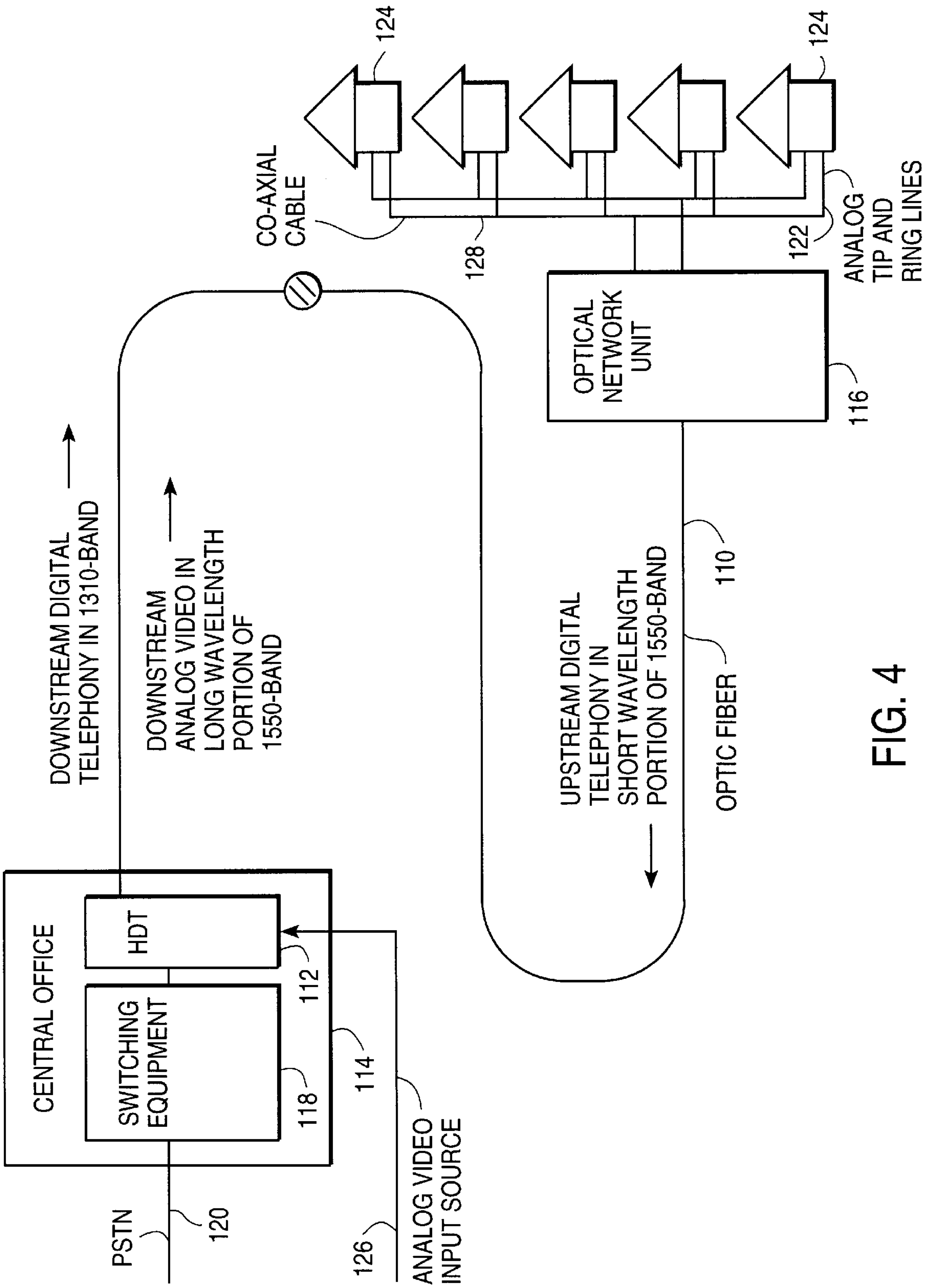
FIG. 4 is a block diagram illustrating a fiber optic system, configured in accordance with an exemplary embodiment of the invention, employing a single optic fiber to transmit upstream and downstream digital telephony and downstream analog video, with the downstream digital telephony signals and the downstream analog video signals simultaneously transmitted over different portions of the 1550-band.

FIG. 4 illustrates a wave division multiplexing optic fiber signal transmission system 100 having a single optic fiber 110 interconnecting an HDT 112 of a telephone company CO 114 with a curbside ONU 116. HDT 112 provides an interface between optic fiber 110 and other components of the CO such as telephone switching equipment 118. HDT 112 also provides an interface between optic fiber 110 and an analog video input line 126 which may be, for example, a co-axial cable connected to cable television company equipment or to a satellite dish receiving transmitted television signals. (Alternatively, the optic fiber may receive the analog video signals of the analog video input line via another device, such as an HDFN, rather than directly through the HDT) ONU 116 provides an interface between optic fiber 110 and analog tip and ring telephone lines 122 connected into homes or offices 124.

Briefly, transmission system 100 operates to transmit downstream digital telephony over the 1310-band and to transmit upstream digital telephony signals over a "short wavelength" portion of the 1550-band, i.e. within a portion of the 1550-band having wavelengths less than a predetermined threshold wavelength of about 1550 nm. Transmission system 100 simultaneously operates to transmit downstream analog video over a "long wavelength" portion of the 1550-band, i.e. within a portion of the 1550-band having wavelengths exceeding the predetermined threshold wavelength. Thus, the upstream digital telephony signals are always transmitted at wavelengths shorter than the threshold wavelength and the downstream analog video signals are always transmitted at wavelengths longer than the threshold wavelength. Accordingly, no significant signaling conflicts occur. In other embodiments, a different threshold wavelength, other than 1550 nm, may alternatively be employed.

Hence, both digital telephony and analog video are carried over the single optic fiber 110. In use, switching equipment 118 of CO 114 receives telephone signals from a remote telephone or other telephony device (not shown) over PSTN 120 intended for one of the houses or offices 124 connected to ONU 116. The switching equipment converts the signals to digital telephony signals if necessary, and forwards the digital telephony signals to HDT 112. HDT 112 transmits the digital telephony signals to ONU 116 over optic fiber 110 using the 1310-band. ONU 116 receives the 1310-band digital telephony signals, converts the signals to analog signals and forwards those signals over analog telephone lines 122 to the house or office intended to receive the telephone signals. ONU 116 receives responsive signals from the house or office over the analog lines, converts those signals to digital signals and transmits the signals as upstream digital telephony signals to the HDT of CO 114 via optic fiber 110 using the aforementioned short wavelength portions of the 1550-band. HDT 116 forwards the received upstream digital telephony signals to switching equipment 118 which converts the digital signals to analog if necessary and forwards the analog signals to PSTN 120 for ultimate connection to the telephone or other telephony device initiating the telephone communication.

As noted, HDT 112 also receives analog video signals, perhaps corresponding to cable television programs, from analog video input 126. HDT 112 (or a separate HDFN) transmits the analog video signals downstream to ONU 116 over optic fiber 110 using the aforementioned long wavelength portions of the 1550-band. ONU 116 forwards the analog video signals to selected houses or offices 124 via co-axial cable 128. The houses or offices selected to receive the analog video signals are typically those that have subscribed to whatever cable television or satellite television service is providing video signals. In other implementations, all houses or homes connected to ONU 116 receive the analog video signals, but only ones provided with the proper decoding equipment are capable of decoding and viewing the video transmission.

Figure 5:
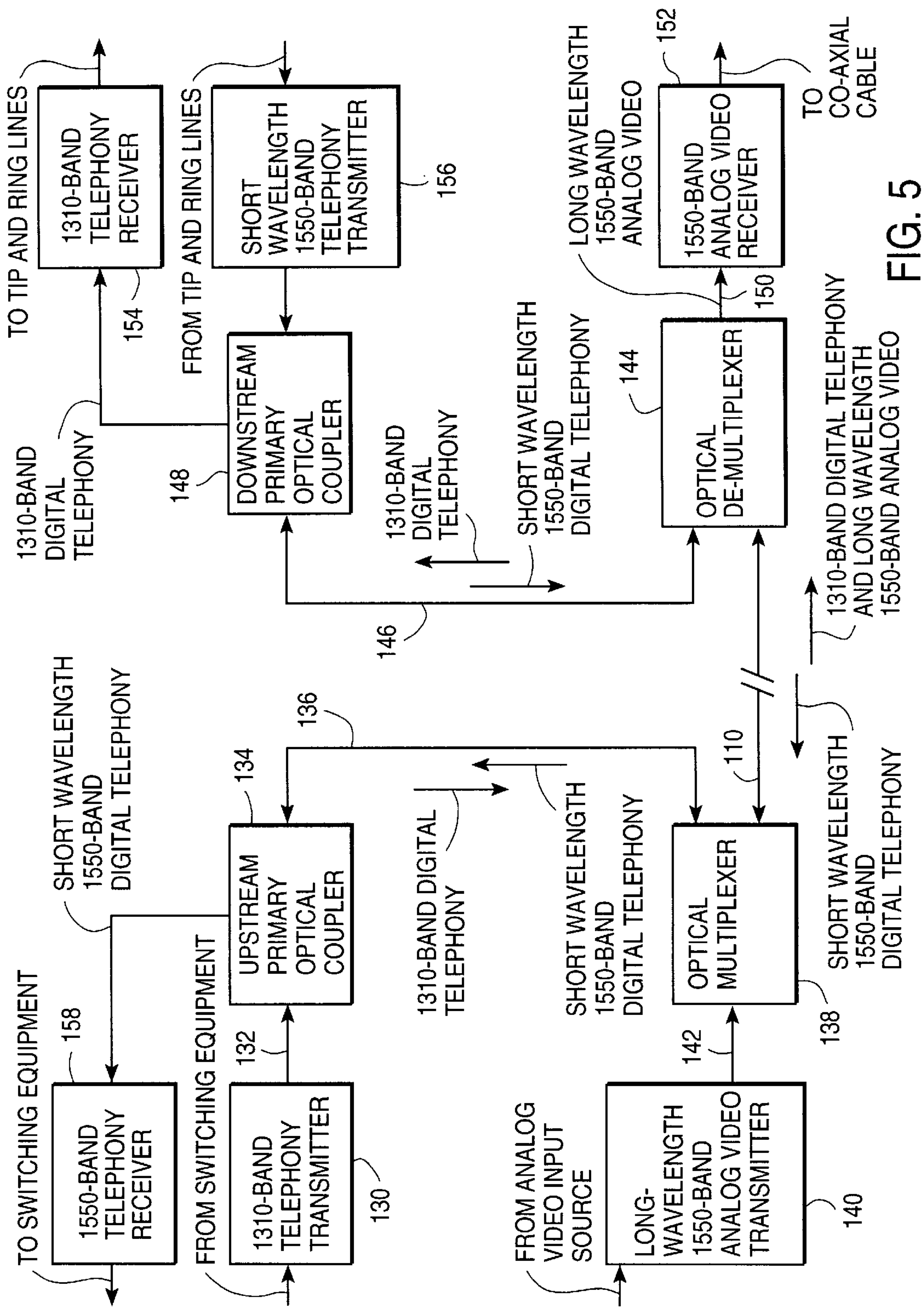
FIG. 5 is a block diagram particularly illustrating signal routing components for routing the digital telephony and analog video signals of the fiber optic system of FIG. 4.

FIG. 5 illustrates components of the CO and ONU of FIG. 4 which are pertinent to transmitting, receiving and routing the upstream and downstream digital telephony signals and the downstream analog video signals. The components of FIG. 5 will first be described with respect to the transmission of downstream signals then with respect to the transmission of upstream signals. A 1310-band telephony transmitter 130 receives digital telephony signals from switching equipment 118 of CO 114 (FIG. 4) and transmits the signals within the 1310-band onto an optic fiber segment 132 to an upstream optical coupler 134. (Telephony transmitter 130, optic fiber segment 132 and upstream optical coupler 134 may all form portions of HDT 112 of FIG. 4.) Upstream optical coupler 134 couples the signals onto another optic fiber segment 136. Depending upon the implementation, upstream optical coupler 134 may transmit all downstream signals received from optic fiber segment 132, regardless of wavelength, onto optic fiber segment 136. In other implementations, upstream optical coupler 134 instead may be configured to operate as a pass-band filter to couple only those downstream signals having wavelengths within the 1310-band onto optic fiber segment 136. Such may be desirable, for example, to help limit signal noise by filtering out all portions of the received signals having wavelengths outside of the pass band of the filter.

A downstream end of optic fiber segment 136 is coupled to an optical multiplexer 138 which receives the downstream digital telephony signals and couples the signals onto optic fiber 110. Depending upon the implementation, optical multiplexer 138 may be part of HDT 112 of FIG. 4 or may be part of an HDFN that is separate from the HDT and, indeed, may be entirely separate from the CO itself. In any case, optical multiplexer 138 also receives downstream analog video signals from a long-wavelength 1550-band analog video transmitter 140 over an optic fiber segment 142 and also couples the received downstream analog video signals onto optic fiber 110. Depending upon the implementation, optical multiplexer 138 may transmit all downstream signals received from optic fiber segments 136 and 142, regardless of wavelength, onto optic fiber 110. In other implementations, optical multiplexer 138 instead may be configured to operate as a dual pass-band filter to couple only those downstream signals having wavelengths either within the 1310-band or within the long wavelength portion of the 1550-band onto optic fiber 110. As before, such may be desirable to help limit signal noise.

Thus optic fiber 110 carries both downstream digital telephony signals within the 1310-band and downstream analog telephony signals within the long wavelength portion of the 1550-band. The signals are received by an optical de-multiplexer 144 which splits the downstream signals based on wavelength with the received 1310-band digital telephony signals being routed along an optic fiber segment 146 to a downstream optical coupler 148 and with the 1550-band analog video signals being routed along an optic fiber segment 150 to a downstream 1550-band analog video receiver 152 for further transmission onto the co-axial cable (FIG. 4). Downstream optical coupler 148 routes the downstream 1310-band digital telephony signals to a 1310-band telephony receiver 154 for subsequent conversion to analog and for coupling to analog tip and ring lines (also FIG. 4).

As far as upstream signals are concerned, a short wavelength 1550-band telephony transmitter 156 receives analog telephony signals from analog tip and ring lines 122, converts the signals to digital, and transmits the digital signals to downstream optical coupler 148. Downstream optical coupler 148 couples the signals onto optic fiber segment 146.

Optical de-multiplexer 144 receives the upstream digital telephony signals and couples the signals onto optic fiber 110. So, as far as upstream signals are concerned, optic fiber 110 carries only digital telephony signals. The upstream signals are received by optical multiplexer 138 which routes the signals along optic fiber segment 136 to upstream optical coupler 134. Upstream optical coupler 134 routes the upstream signals to a 1550-band telephony receiver 158 for forwarding to switching equipment 118.

Thus downstream digital telephony signals are routed from 1310-band telephony transmitter 130 to 1310-band telephony receiver 154. Downstream analog video signals (which are carried in the long wavelength portion of the 1550-band) are routed from analog video transmitter 130 to analog video receiver 152. Upstream digital telephony signals (which are carried in the short wavelength portion of the 1550-band) are routed from 1550-band telephony transmitter 156 to 1550-band telephony receiver 158. Collectively, upstream optical coupler 134, downstream optical coupler 148, optical multiplexer 138 and optical de-multiplexer 144 provide a means for routing the various signals to their intended destinations. Other suitable means for routing may alternatively be employed. As to the upstream optical coupler 134, downstream optical coupler 148, optical multiplexer 138 and optical de-multiplexer 144 components themselves, any suitable device for performing the routing functions described above may be employed. Also, any suitable signal transmission and reception components may be employed for transmitting and receiving the upstream and downstream digital telephony signals and the downstream analog video signals at the various wavelengths described above.

Figure 6:
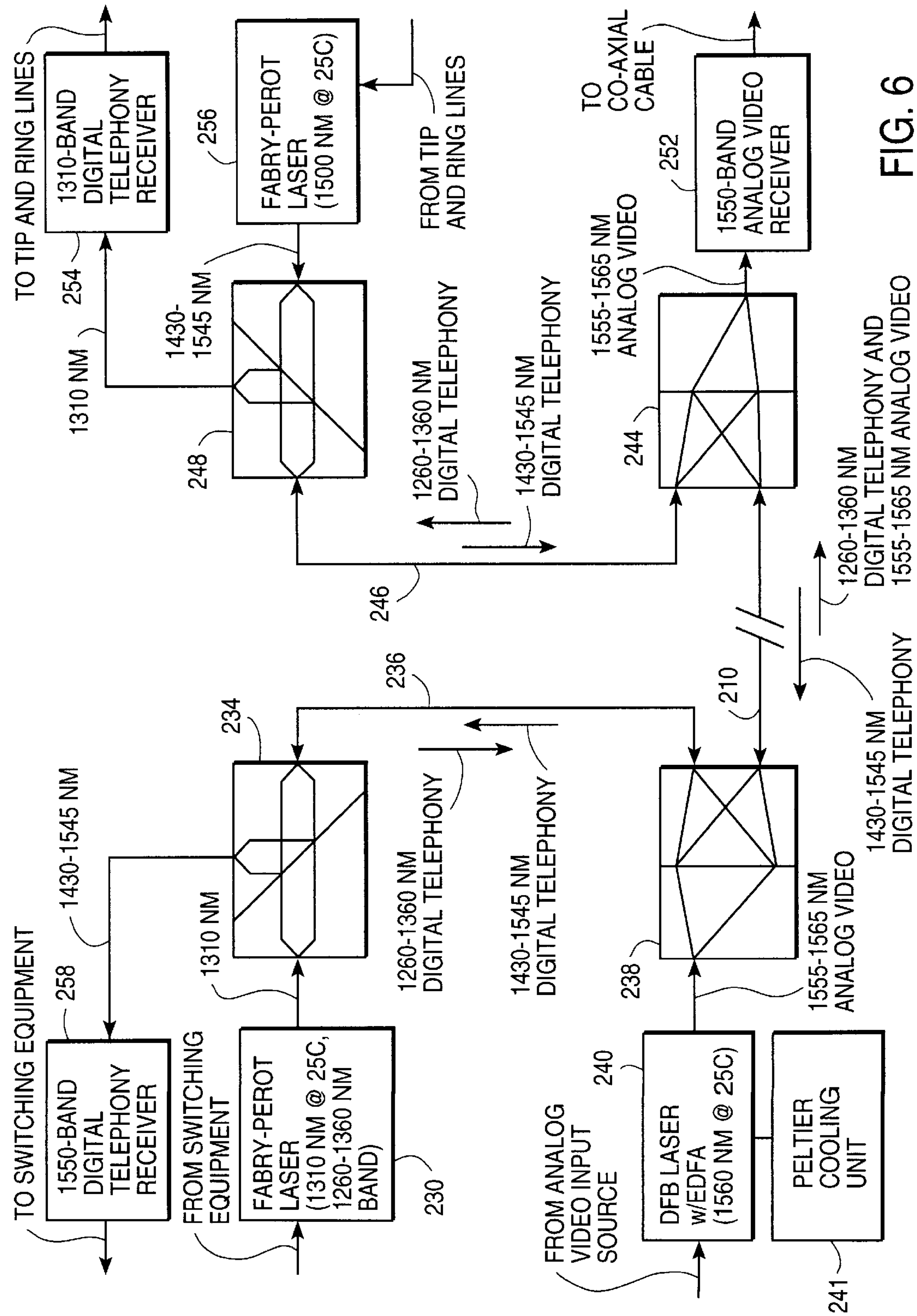
FIG. 6 is a block diagram illustrating one specific implementation of the signal routing components shown in FIG. 5.

FIG. 6 illustrates one specific embodiment of the routing components and the transmission and reception components of FIG. 5. The operation and interconnection of the components of FIG. 6 corresponds with that of FIG. 5 and only pertinent additional features will be described. Like components are identified with like reference numerals incremented by 100.

A Fabry-Perot laser 230 producing 1310 nm at 25 degrees C is employed to generate the 1310-band downstream digital telephony signals, i.e. signals within the range of 1260–1360 nm. The downstream digital telephony signals are coupled into a 1310 nm TX; 1500–1545 nm RX BIDI mux/de-mux 234 which routes downstream signals within the 1310-band to a graded-index fiber lens optical mux 238 (such as those sold under the tradename SELFOC) and routes upstream signals within a 1430–1545 nm portion of the 1550-band to a 1550-band digital telephony receiver 258.

Graded-index fiber lens optical mux 238 also receives downstream analog video signals generated by a DFB laser 240 having an EDFA producing 1560 nm. DFB laser 240 is cooled by a Peltier cooling unit 241 which maintains the wavelength of DFB laser 240 close to 1560 nm. By setting the center wavelength to 1560 nm and temperaturecontrolling the DFB laser, it can be assured that the transmission wavelength of the analog video signal will never fall below 1550 nm for any practical operating conditions. A DFB laser is employed for transmitting the analog video, in part, to achieve high spectral purity needed for high bandwidth analog transmission. A distributed Bragg reflector (DBR) laser can alternatively be employed.

Graded-index fiber lens optical mux 238 routes the analog video signals received from DFB laser 240 and the digital telephony signals received from mux/de-mux 234 onto silica optic fiber 210 to a graded-index fiber lens optical de-mux 244 (which may also be a graded-index fiber lens of the type sold under the tradename SELFOC.) Optical de-mux 244 filters the received signals and routes the analog video signals received with wavelengths from 1550–1565 nm to a 1550-band analog video receiver 252 and routes the 1310-band digital telephony signals to a 1460–1545 nm TX; 1310 nm RX BIDI mux/de-mux 248.

Mux/de-mux 248 routes the downstream digital telephony signals within the 1310-band to a 1310-band digital telephony receiver 254. Mux/de-mux 248 also receives upstream digital telephony signals generated by a Fabry-Perot laser 256 producing 1500 nm at 25 degrees C with a temperature drift profile configured to not exceed a transmission wavelength of 1550 nm at 85 degrees Celsius. Fabry-Perot laser 256 is not cooled. Accordingly, the transmission wavelength of the upstream digital telephony signal may vary significantly. But by setting the center wavelength to 1500 nm and providing for the aforementioned temperature drift profile, it can be assured that the transmission wavelength of the upstream digital telephony signal will never exceed 1550 nm for all practical operating conditions. Hence, no signal conflicts will occur between the upstream digital telephony signals and the downstream analog video signals even though both are transmitted within the 1550-band of the silica fiber. Also it should be noted that, because the operating temperature may drop under certain conditions, the output wavelength of Fabry-Perot laser 256 may at times fall somewhat below 1500 nm. Accordingly, the various couplers and multiplexers of FIG. 6 are preferably configured to accommodate upstream transmission wavelengths in the range of 1430–1545 nm.

Thus a specific embodiment has been described wherein Fabry-Perot lasers are employed as signal transmitters for digital telephony and a Peltier-cooled DFB laser with an EDFA is employed as a signal transmitter for analog video. In other implementations, different signal generating devices may be employed. For example, various types of LED's may alternatively be employed. Also, various other types of lasers may be employed, such as neodymium lasers for generating 1310-band signals and InGaAsP lasers for generating 1550-band signals. Other types of fiber amplifiers besides EDFA's may be used, where appropriate, such as praseodymium-doped fiber amplifiers (PDFA's). Or, depending upon the implementation, no fiber amplifiers whatsoever may be used. As far as the routing components are concerned, other types of couplers may be employed for routing and/or multiplexing the various signals besides those shown in FIG. 6. For example, beam splitters or planar wave guides can alternatively be employed. It is preferable that the various components used to implement the system provide sufficient performance to meet TA/R 909 CSA or EXCSA link budgets. In general, though, the least expensive components capable of satisfying the TA/R 909 CSA or EXCSA link budgets are preferred to thereby minimize system costs.

As to the actual transmission of data corresponding to the analog video signals and the digital telephony signals, any appropriate technique may be employed. For example, synchronous optical network (SONET) devices may be employed to transmit the data in frames, perhaps in accordance with a proprietary format.

As noted, the system described above with respect to FIG. 6 employs wave division multiplexing because different signals are transmitted over the same optic fiber using different wavelength bands, specifically the aforementioned 1310-band, short wavelength 1550-band and the long wavelength 1550-band. In other embodiments, dense wave division multiplexing may also be employed to further subdivide each band to thereby allow for transmission of additional channels of signals. For example, the 1310-band may be subdivided into a set of separate sub-bands with different telephony channels carried over the sub-bands. Likewise, the long wavelength portion or the short wavelength portion of the 1550-band may be subdivided into sub-bands. Of course, appropriate frequency selective multiplexers need to be provided to route the signals in the various sub-bands to their intended destinations.

What have been described are systems for transmitting digital telephony and analog video signals over a single optic fiber. The various functional components of the systems may be implemented using any appropriate technology. The exemplary embodiments of the invention described herein are merely illustrative of the invention and should not be construed as limiting the scope of the invention. Also, it should be appreciated that not all components necessary for a complete implementation of a practical system are illustrated or described in detail. Rather, only those components necessary for a thorough understanding of the invention have been illustrated and described.

What is claimed is:

1. A system for communicating both analog video and digital telephony over a single optic fiber using wave division multiplexing comprising:

an analog video signal transmitter coupled to transmit analog video signals downstream through the optic fiber, the signals being restricted to a first portion of a first transmission band wherein the first portion has wavelengths exceeding a preselected threshold wavelength within the first band;

an upstream digital telephony signal transmitter coupled to transmit digital telephony signals upstream through the optic fiber with signals being restricted to a second portion of said first band wherein said second portion has wavelengths less than the preselected threshold wavelength; and a downstream digital telephony signal transmitter coupled to transmit digital telephony signals downstream through the optic fiber with signals being restricted to a second band that is entirely separate from said first band.

2. The system of claim 1 wherein the first transmission band has wavelengths centered at about 1550 nm, the preselected threshold wavelength within the first band is at about 1550 nm, and the second band has wavelengths centered at about 1310 nm.

3. The system of claim 1 further comprising a router coupled to route the transmitted analog video signals, the upstream digital telephony signals and the downstream digital telephony signals through the optic fiber to respective receivers, wherein said router comprises:

a first optic coupler interconnecting one end of the single optic fiber to said downstream analog video transmitter and to a second optic coupler, with said first optic coupler routing downstream signals onto the optic fiber and routing upstream signals within the second portion of the second transmission band to the second optic coupler;

with said second optic coupler interconnecting said first optic coupler to said downstream analog video transmitter and to an upstream digital telephony receiver, with said second optic coupler routing downstream signals within the second transmission band to said first optic coupler for subsequent transmission onto the optic fiber and routing upstream signals within the second portion of the second transmission band to said upstream digital telephony receiver; and a third optic coupler interconnecting an opposing end of the single optic fiber to an analog video receiver and to a fourth optic coupler, with said third optic coupler routing downstream signals within the first portion of the first transmission band to said analog video receiver and routing downstream signals within the second transmission band to said fourth optic coupler and also routing upstream signals within the second transmission band to said fourth optic coupler and also routing upstream signals within the second portion of the first transmission band onto the optic fiber;

with said fourth optic coupler interconnecting said third optic coupler to the upstream digital telephony transmitter and to a downstream digital telephony receiver, with said fourth optic coupler routing downstream signals within the second transmission band to said downstream digital telephony receiver and routing upstream signals within the second portion of the second transmission band to said third optic coupler for subsequent transmission onto the optic fiber.

4. The system of claim 3 wherein said first and third optic couplers include frequency selective BIDI multiplexers and said second and fourth optic couplers include graded-index fiber lenses.

5. The system of claim 3 wherein said first optic coupler routes downstream signals with wavelengths extending from about 1555 to 1565 nm onto the optic fiber and routes upstream signals with wavelengths extending from about 1460 to 1545 nm to said second optic coupler;

said second optic coupler routes downstream signals with wavelengths centered around 1310 nm to said first optic coupler for subsequent transmission onto the optic fiber and routes upstream signals with wavelengths extending from about 1460 to 1545 nm to said upstream digital telephony receiver;

said third optic coupler routes downstream signals with wavelengths extending from about 1555 to 1565 nm to said analog video receiver and routes downstream signals with wavelengths centered around 1310 nm to said fourth optic coupler and routes upstream signals with wavelengths extending from about 1460 to 1545 nm onto the optic fiber; and said fourth optic coupler routes downstream signals with wavelengths centered at about 1310 nm to said downstream digital telephony receiver and routes upstream signals with wavelengths extending from about 1460 to 1545 nm to said third optic coupler for subsequent transmission onto the optic fiber.

6. The system of claim 1 wherein said analog video signal transmitter includes a DFB laser transmitter.

7. The system of claim 6 wherein said DFB laser transmitter of said analog video signal transmitter includes an erbium-doped fiber amplifier.

8. The system of claim 6 wherein said DFB laser transmitter of said analog video signal transmitter has a center wavelength set to about 1560 nm.

9. The system of claim 6 wherein said DFB laser transmitter is held to a substantially constant temperature by a peltier cooling unit to maintain a substantially constant wavelength.

10. The system of claim 1 wherein said upstream digital telephony signal transmitter includes a Fabry-Perot laser transmitter.

11. The system of claim 10 wherein said Fabry-Perot laser transmitter of said upstream digital telephony signal transmitter has a center wavelength set to about 1500 nm at 25 degrees Celsius and has a temperature drift profile configured to not exceed a transmission wavelength of about 1555 nm at 85 degrees Celsius.

12. The system of claim 1 wherein said downstream digital telephony signal transmitter includes a Fabry-Periot laser transmitter.

13. The system of claim 12 wherein said Fabry-Perot laser transmitter of said downstream digital telephony signal transmitter has a center wavelength set to about 1310 nm at 25 degrees Celsius.

14. A system for communicating first and second types of signals over a single silica optic fiber using wave division multiplexing comprising:

means for communicating a first type of signals through the silica optic fiber with the signals being restricted to a first portion of a first transmission band centered at about 1550 nm wherein the first portion has wavelengths exceeding a preselected threshold wavelength within the first band;

means for communicating a second type of signals upstream through the optic fiber with signals being restricted to a second portion of the first band wherein the second portion has wavelengths less than the preselected threshold wavelength; and means for communicating the second type of signals downstream through the optic fiber with signals being restricted to a second band centered at about 1310 nm that is entirely separate from the first band.

15. The system of claim 14 wherein said first type of signals are analog video signals and said second type of signals are digital telephony signals.

16. A system for communicating both analog video and digital telephony over a single optic fiber using wave division multiplexing comprising:

an analog video signal transmitter for transmitting analog video signals downstream through the optic fiber with the signals being restricted to a first portion of a first transmission band wherein the first portion has wavelengths exceeding a preselected threshold wavelength within the first band;

an upstream digital telephony signal transmitter for transmitting digital telephony signals upstream through the optic fiber with signals being restricted to a second portion of the first band wherein the second portion has wavelengths less than the preselected threshold wavelength; and a downstream digital telephony signal transmitter for transmitting digital telephony signals downstream through the optic fiber with signals being restricted to a second band that is entirely separate from the first band.

17. The system of claim 16 wherein the first transmission band has wavelengths centered at about 1550 nm, the preselected threshold wavelength within the first band is at about 1550 nm, and the second band has wavelengths centered at about 1310 nm.

18. The system of claim 16 further comprising a routing system for routing the transmitted analog video signals, the upstream digital telephony signals and the downstream digital telephony signals through the optic fiber to respective receivers wherein said routing system comprises:

a first optic coupler interconnecting one end of the single optic fiber to said downstream analog video transmitter and to a second optic coupler, with said first optic coupler routing downstream signals onto the optic fiber and routing upstream signals within the second portion of the second transmission band to said second optic coupler;

with said second optic coupler interconnecting said first optic coupler to said downstream analog video transmitter and to an upstream digital telephony receiver, with said second optic coupler routing downstream signals within the second transmission band to said first optic coupler for subsequent transmission onto the optic fiber and routing upstream signals within the second portion of the second transmission band to said upstream digital telephony receiver; and a third optic coupler interconnecting an opposing end of the single optic fiber to an analog video receiver and to a fourth optic coupler, with said third optic coupler routing downstream signals within the first portion of the first transmission band to said analog video receiver and routing downstream signals within the second transmission band to said fourth optic coupler and also routing upstream signals within the second portion of the first transmission band onto the optic fiber;

with said fourth optic coupler interconnecting said third optic coupler to said upstream digital telephony transmitter and to a downstream digital telephony receiver, with said fourth optic coupler routing downstream signals within the second transmission band to the downstream digital telephony receiver and routing upstream signals within the second portion of the second transmission band to said third optic coupler for subsequent transmission onto the optic fiber.

19. The system of claim 18 wherein said first and third optic couplers include frequency selective BIDI multiplexers and said second and fourth optic couplers include graded-index fiber lenses.

20. The system of claim 18 wherein said first optic coupler routes downstream signals with wavelengths extending from about 1555 to 1565 nm onto the optic fiber and routes upstream signals with wavelengths extending from about 1460 to 1545 nm to said second optic coupler;

said second optic coupler routes downstream signals with wavelengths centered around 1310 nm to said first optic coupler for subsequent transmission onto the optic fiber and routes upstream signals with wavelengths extending from about 1460 to 1545 nm to said upstream digital telephony receiver;

said third optic coupler routes downstream signals with wavelengths extending from about 1555 to 1565 nm to said analog video receiver and routes downstream signals with wavelengths centered around 1310 nm to said fourth optic coupler and routes upstream signals with wavelengths extending from about 1460 to 1545 nm onto the optic fiber; and said fourth optic coupler routes downstream signals with wavelengths centered at about 1310 nm to said downstream digital telephony receiver and routes upstream signals with wavelengths extending from about 1460 to 1545 nm to said third optic coupler for subsequent transmission onto the optic fiber.

21. The system of claim 16 wherein said analog video signal transmitter includes a DFB laser transmitter.

22. The system of claim 21 wherein said DFB laser transmitter of said analog video signal transmitter includes an erbium-doped fiber amplifier.

23. The system of claim 21 wherein said DFB laser transmitter of said analog video signal transmitter has a center wavelength set to about 1560 nm.

24. The system of claim 21 wherein said DFB laser transmitter is held to a substantially constant temperature by a peltier cooling unit to maintain a substantially constant wavelength.

25. The system of claim 16 wherein said upstream digital telephony signal transmitter includes a Fabry-Perot laser transmitter.

26. The system of claim 25 wherein said Fabry-Perot laser transmitter of said upstream digital telephony signal transmitter has a center wavelength set to about 1500 nm at 25 degrees Celsius and has a temperature drift profile configured to not exceed a transmission wavelength of about 1555 nm at 60 degrees Celsius.

27. The system of claim 16 wherein said downstream digital telephony signal transmitter includes a Fabry-Perot laser transmitter.

28. The system of claim 27 wherein said Fabry-Perot laser transmitter of said downstream digital telephony signal transmitter has a center wavelength set to about 1310 nm at 25 degrees Celsius.

29. A method for communicating both analog video and digital telephony over a single optic fiber using wave division multiplexing comprising the steps of:

transmitting analog video signals downstream through the optic fiber with the signals being restricted by an analog video transmitter to a first portion of a first transmission band wherein the first portion has wavelengths exceeding a preselected threshold wavelength within the first band;

transmitting digital telephony signals upstream through the optic fiber with signals being restricted by an upstream digital telephony signal transmitter to a second portion of the first band wherein the second portion has wavelengths less than the preselected threshold wavelength; and transmitting digital telephony signals downstream through he optic fiber with signals being restricted by a downstream digital telephony signal transmitter to a second band that is entirely separate from the first band.

30. The method of claim 29 wherein the first transmission band has wavelengths centered at about 1550 nm, the preselected threshold wavelength within the first band is at about 1550 nm, and the second band has wavelengths centered at about 1310 nm.

31. The method of claim 29 wherein said analog video signal transmitter includes a DFB laser transmitter.

32. The method of claim 31 wherein said DFB laser transmitter of said analog video signal transmitter includes an erbium-doped fiber amplifier.

33. The method of claim 31 wherein said DFB laser transmitter of said analog video signal transmitter has a center wavelength set to about 1560 nm.

34. The method of claim 31 wherein said DFB laser transmitter is held to a substantially constant temperature by a peltier cooling unit to maintain a substantially constant wavelength.

35. The method of claim 29 wherein said upstream digital telephony signal transmitter includes a Fabry-Perot laser transmitter.

36. The method of claim 35 wherein said Fabry-Perot laser transmitter of said upstream digital telephony signal transmitter has a center wavelength set to about 1500 nm at 25 degrees Celsius and has a temperature drift profile configured to not exceed a transmission wavelength of about 1555 nm at 60 degrees Celsius.

37. The method of claim 29 wherein said downstream digital telephony signal transmitter includes a Fabry-Perot laser transmitter.

38. The method of claim 37 wherein said Fabry-Perot laser transmitter of said downstream digital telephony signal transmitter has a center wavelength set to about 1310 nm at 25 degrees Celsius.

39. A method for communicating first and second types of signals over a single silica optic fiber using wave division multiplexing comprising the steps of:

communicating a first type of signals through the silica optic fiber with the signals being restricted by a first transmitter to a first portion of a first transmission band centered at about 1550 nm wherein the first portion has wavelengths exceeding a preselected threshold wavelength within the first band;

communicating a second type of signals upstream through the optic fiber with signals being restricted by a second transmitter to a second portion of the first band wherein the second portion has wavelengths less than the preselected threshold wavelength; and communicating the second type of signals downstream through the optic fiber with signals being restricted by a third transmitter to a second band centered at about 1310 nm that is entirely separate from the first band.

40. The method of claim 39 wherein said first type of signals are analog video signals and said second type of signals are digital telephony signals.

* * * * *